United States Patent
Yeomans (10) Patent No.: US 8,205,362 B2
(45) Date of Patent: Jun. 26, 2012

(54) DIGGING POINT ASSEMBLY

(76) Inventor: Allan J. Yeomans, Queensland (AU)

( * ) Notice: Subject to any disclaimer, the term of this patent is extended or adjusted under 35 U.S.C. 154(b) by 159 days.

(21) Appl. No.: 12/775,663

(22) Filed: May 7, 2010

(65) Prior Publication Data

US 2010/0287797 A1    Nov. 18, 2010

(30) Foreign Application Priority Data

May 12, 2009  (AU) ................................ 2009902090

(51) Int. Cl.
*A01B 13/08*    (2006.01)
(52) U.S. Cl. .......................................... 37/453; 172/699
(58) Field of Classification Search .................. 37/395, 37/446–460; 172/699–719, 730, 745, 772.5, 172/701.1–701.3, 772, 750; 403/332.2, 328
See application file for complete search history.

(56) References Cited

U.S. PATENT DOCUMENTS

| | | | |
|---|---|---|---|
| 3,881,262 A | 5/1975 | Cullen | |
| 4,027,408 A | 6/1977 | Ramella et al. | |
| 4,129,934 A * | 12/1978 | Gettman | 29/426.2 |
| 4,762,184 A | 8/1988 | Yeomans | |
| 4,899,830 A * | 2/1990 | Maguina-Larco | 172/699 |
| 4,932,478 A * | 6/1990 | Jones | 172/699 |
| 4,976,566 A | 12/1990 | Yeomans | |
| 5,119,888 A * | 6/1992 | Hall | 172/699 |
| 5,195,597 A | 3/1993 | Yeomans | |
| 5,415,236 A * | 5/1995 | Williams | 172/699 |
| 5,988,291 A | 11/1999 | Yeomans | |
| 6,374,521 B1 * | 4/2002 | Pippins | 37/456 |
| 6,401,834 B1 | 6/2002 | Yeomans | |
| 6,516,895 B2 | 2/2003 | Yeomans | |
| 6,640,731 B1 * | 11/2003 | Rowlett et al. | 111/152 |

FOREIGN PATENT DOCUMENTS

| | | |
|---|---|---|
| GB | 2 093 325 | 9/1982 |
| GB | 2 209 651 | 5/1989 |

* cited by examiner

*Primary Examiner* — Robert Pezzuto
(74) *Attorney, Agent, or Firm* — Wood, Phillips, Katz, Clark & Mortimer (57) ABSTRACT

A digging point assembly for use in earthworking which comprises a main body which includes a socket member defining a hollow socket for engagement with a leading tip of a tyne and first and second replaceable wear parts which are mounted to the main body to protect the leading end and top of the socket member which are normally exposed to wear in movement through soil, the first wear part being maintained in an operative position at the leading end of the socket by the tyne and cooperating with the second wear part to maintain the second wear part in operative position protecting the top of the socket member. The digging point assembly may also include a third replaceable wear part at the leading end of the body part which is held in position by cooperation with the first replaceable wear part.

38 Claims, 9 Drawing Sheets

DIGGING POINT ASSEMBLY

Cross-Reference to Related Application

This application hereby claims the priority of Australian Provisional Patent Application No. 2009902090, filed May 12, 2009, which is hereby incorporated by reference in its entirety.

TECHNICAL FIELD

This invention relates to a digging point assembly and in particular to a digging point assembly for used in agricultural applications for working of the soil. The digging point assembly of the invention is particularly suited for use in subsoiling or deep-working operations but may be used in any other ploughing operations.

BACKGROUND ART

Subsoiling ploughing operations involve the use of earth working or ploughing equipment usually at depths which are greater than depths at which any previous cultivation on a particular parcel of land has occurred. As a result, tynes of the above equipment used in such an environment are subject to considerable wear at their leading ends and accordingly replaceable wear resistant digging points or tools are commonly used at the leading ends of the tynes. Points or tools of this type increase the effective life of the tyne by protecting the leading end of the tyne to which they are attached. Known points or tools have a shape which allows for considerable wear whilst maintaining a reasonable cutting edge even when worn.

To increase their operating life, replaceable points have been made of an increased size and weight. The extra mass of material in the points however tends to round off in use and decreases the digging ability of the implement.

Replaceable digging points or tools which are used are also subject to wear not only at their tips but also in other exposed regions of the point or tool. Accordingly digging points or tools which are known also normally have to be replaced regularly. Thus where the digging point has worn to a stage where damage to the tyne is imminent, the point must be discarded to avoid any wear or damage to the tyne. In certain soil types or where subsoiling operations are undertaken, this occurs regularly which adds to costs as the whole point or tool has to be removed from the tyne and replaced.

It would be desirable to provide an improved digging point assembly which overcomes or alleviates one or more of the disadvantages of the above described prior art or which at least provides an effective alternative to the prior art.

SUMMARY OF THE INVENTION

The present invention provides in a preferred aspect although not necessarily the broadest aspect, a digging point assembly comprising a main body adapted to be mounted to a tyne of an earth working implement, and at least two sub-parts, each said sub-part comprising a replaceable wear part adapted to protect different parts of said main body exposed in use to wear in movement of said digging point assembly through soil, and wherein a first said sub-part is adapted in its operative position to cooperate directly or indirectly with a second said sub-part to maintain the second sub-part in its operative position.

Preferably the first sub-part is retained in its operative position by cooperation with the tyne when the main body is operatively engaged with the tyne. When the first sub-part is retained in operative position by the tyne, the first sub-part is suitably prevented from detachment from the main body and the first sub-part in its operative position prevents detachment of the second sub-part from the main body.

Preferably a retaining pin is provided, the retaining pin being adapted to cooperate with the second sub-part to prevent detachment thereof. Preferably the retaining pin is associated with and held in position by the first sub-part.

Preferably the main body includes a central longitudinally extending socket member defining a socket adapted for engagement by the tip of a tyne. Preferably the socket is of a forwardly tapering configuration and is open on the normal trailing side of the main body and a tip or foot of the tyne is of a corresponding tapering configuration such that it may be inserted into, to mate with the socket.

Preferably both sub-parts are exposed directly to the soil as the digging point assembly is advanced through the soil such that portions of the main body of the digging point assembly beneath or behind the sub-parts are protected from direct contact with the soil and therefore will not be exposed to excessive wear. Typically the first sub-part protects a leading end of the socket member and the second sub-part protects an upper side of the socket member.

Preferably the first sub-part includes a tongue adapted to extend into a leading end of the socket which is open and the leading end of the tyne tip or foot in its operative position is adapted to be located adjacent to or abut the tongue to prevent detachment or substantial movement of the first sub-part away from its operative position.

Any suitable means may be provided for connecting the tyne tip or foot to the digging point assembly. Such means may comprise a connection arrangement between the tip and digging point assembly on the underside of the digging point assembly and tip. For this purpose, the underside of the point assembly may be provided with a connector engagement means for engagement with a bolt or stud which extends to the underside of the tip for connection thereto. Alternatively of additionally, the tip or foot and main body of the digging point assembly may be provided with corresponding openings which may be aligned to receive a retaining pin or wire therethrough.

Preferably the main body includes a central splitter fin which extends longitudinally of and forwardly of the socket member and a transverse opening is provided in the main body between the fin and socket member. The first sub-part is suitably adapted to be located in the opening and suitably includes flanges adapted to be located on opposite sides of the fin. The first sub-part further may include a recess or channel between the flanges adapted to accommodate the retaining pin.

In one form the recess or channel has an open side to receive the retaining pin, the open side of the recess or channel being closed when the first sub-part is located in its operative position with the flanges on opposite sides of the fin to capture the retaining pin in the recess or channel in an operative position. Preferably the retaining pin in its operative position includes a portion extending above the first sub-part.

Preferably the second sub-part includes a pair of arms adapted to be located on or adjacent to shoulders on the upper side of the socket member and on opposite sides of the central fin which suitably extends centrally along the socket member. The arms of the second sub-part thus protect the shoulders of the socket member from direct contact with the soil and therefore prevent wear in the shoulders. Preferably the second sub-part includes a transverse cross arm adapted to extend through the transverse opening in the main body, the cross arm being adapted to be located adjacent to and rewarwardly of the extending portion of the retaining pin, the latter acting as a stop to prevent or restrict forward movement and detachment of the second sub-part when in its operative position. The second sub-part is suitably of an elongated U-shaped configuration with the pairs of arms of the second sub-part comprising the respective legs of the U and being joined at one end by the transverse cross arm.

Preferably the main body includes locating means for locating the second sub-part. Preferably in the operative position, the retaining pin prevents detachment of the second sub-part from the locating means. In one form the locating means may comprise stops or recesses for receipt of hooks on the arms of the second sub-part. In another form, the locating means may comprise means to receive and capture the free ends of the arms of the second sub-part.

The first and second sub-parts suitably are of a width to protect at least the sides and leading end of the socket member of the main body.

In a further embodiment, the digging point assembly includes a third sub-part which comprises a replaceable leading end or shroud part adapted to protect the leading end of the body. Preferably the third sub-part is adapted to be retained in position by cooperation with the first sub-part. Preferably the first sub-part includes a stop member adapted in its operative position to act as a stop to prevent detachment of the third sub-part from said body. Preferably the third sub-part includes a headed member and the stop member is adapted to cooperate with the headed member. The headed member may comprise a tongue terminating in a head and the first sub-part may include a pair of stop members adapted to be located on opposite sides of the tongue for cooperation with the head. Suitably the tongue is provided on the lower side of the third sub-part to extend beneath the first sub-part to enable cooperation with the stop members.

Preferably the third sub-part includes a head defining a socket and the leading end of the body is complementary to the socket so as to be receivable therein. Preferably the third sub-part further includes opposite side aims or fins which extend from the head and which when the third sub-part part is engaged with the body comprise extensions of the side fins of the body.

The sub-parts may be formed of any suitable material which may comprise a suitable wear resistant material such as tungsten carbide steel or alternatively the sub-parts as with the main body of the digging point assembly may be formed of steel.

In another aspect, the present invention provides a digging point assembly comprising a main body adapted to be mounted to a tyne of an earth working implement, said main body having a longitudinal axis and a leading end and a trailing end, said main body including a socket member extending along said longitudinal axis, said socket member defining a hollow socket open at least at the trailing end of said main body for receiving a leading tip of said tyne, first and second replaceable wear parts mounted to said main body to protect different parts of said main body normally exposed to wear in movement of said main body through earth or soil, and wherein when said body is mounted to a said tyne, said first wear part is maintained in an operative position by said tyne and cooperates directly or indirectly with said second wear part to maintain said second wear part in operative position and prevent its detachment from said main body.

The socket is suitable open at the leading end of said socket member and the first wear part is mounted to the main body to extend transversely thereof to protect the leading end of the socket member. Preferably the first wear part includes a rearwardly extending tongue which extends into the open leading end of the socket and the tip of the tyne cooperates with the tongue to prevent detachment of the first wear part from the body.

Preferably the main body includes a transverse opening and a longitudinally extending fin and the first wear part including spaced flanges and is received in the opening such that respective flanges are arranged on opposite sides of the fin. The first wear part also suitably includes a recess or channel between the flanges which accommodates a retaining pin, said recess or channel being closed on one side by the fin to capture the retaining pin in the recess or channel. The retaining pin suitably cooperates with a leading end of the second wear part to prevent detachment thereof. Preferably the retaining pin has a portion extending above the first wear part to act as a stop to the second wear part.

The socket member includes a pair of shoulders on its top side on opposite sides of the central fin and wherein the second wear part includes a pair of side arms located and seating on the shoulders. The second wear part suitably is of a U-shaped configuration and includes a cross arm joining the side arms, the cross arm extending through the opening in the main body and being located adjacent the extending portion of the retaining pin, the extending portion of the pin acting as a stop to the cross arm to prevent detachment of the second wear part from its operative position. Suitably means are proved for capturing trailing ends of the arms when the second wear part is in its operative position and the retaining pin prevents disengagement of the ends of the arms from the capturing means.

The digging point assembly may also include a third replaceable wear part located at a leading end of the main body for protecting the leading end of the body. Preferably the first wear part cooperates with the third wear part to maintain the third part in its operative position.

The third wear part may include a socket and the leading end of the main body includes engagement means complementary to the socket for receipt therein. The main body may also include opposite side fins and the third part may include opposite side arms or fins which in the operative position of said third part comprise extensions of the fins of the body.

Suitably, the first wear part includes a stop member which acts as a stop to prevent detachment of the third wear part from the body. The third part may include a headed member on its lower side and the stop member is adapted to cooperate with the headed member. The headed member may comprise a tongue terminating in an enlarged head and the first wear part may include a pair of spaced stop members adapted to be located on opposite sides of the tongue for cooperation with the head.

BRIEF DESCRIPTION OF THE DRAWINGS

To enable the invention to be more fully understood and put into practical effect, reference will now be made to the accompanying drawings which illustrate preferred embodiments of the invention and wherein.

DETAILED DESCRIPTION OF THE PREFERRED EMBODIMENT

Referring to the drawings and firstly to FIGS. 1 to 5, there is illustrated a digging point assembly 10 according to an embodiment of the invention, the point assembly 10 comprising a main point body 11 having a longitudinal axis X-X and which, in use, is connected to the working end or tip of a tyne of agricultural implement, the main body 11 carrying a pair of replaceable sub-parts comprising wear parts 12 and 13 whose purpose will become apparent further below. The main body 11 includes a blade-like base 14 having a leading end provided in this case with a transversely extending recess 15 adapted to receive a hardened tip or strip 16 (shown in dotted outline in FIG. 4) of complementary shape to the recess 15, the tip 16 typically being formed of tungsten carbide and being secured in position by soldering. The base 14 of the main body 11 additionally includes opposite rearwardly extending side fins 17 arranged symmetrically relative to the axis X-X. The base 14 additionally may include on its underside, connector engagement means 18 for use in positively connecting the main body 10 to a tyne in a similar manner to that described in my U.S. Pat. No. 6,401,834.

Arranged centrally of the base 14 of main body 11 relative to the fins 17 and extending longitudinally along the axis X-X thereof is a socket member 19 (shown also in FIGS. 6 and 7) which defines a hollow socket 20 which opens to the rear of the base 14 at end 21, the socket member 19 and socket 20 tapering from the end 21 towards the leading end of the main body 11 for receipt of the tip of a tyne which is of a complementary or mating tapering shape. The socket 20 is provided with upper and lower channel portions 22 and 23 for receipt of upper and lower lugs on a tip of a tyne.

The main body 11 additionally includes an upright central splitter fin 24 extending longitudinally along the axis X-X which is aligned with the socket member 19 and which extends along and forwardly of the socket member 19. The fin 24 is inclined downwardly at its leading end 25 to meet the base 14. The edge of the leading end 25 is formed with longitudinally extending recesses 26 to receive wear members 27 (shown in dotted outline in FIG. 4) similar to the tip 16 to protect the leading end 25 of the fin 24 against wear.

Figures 1, 2:
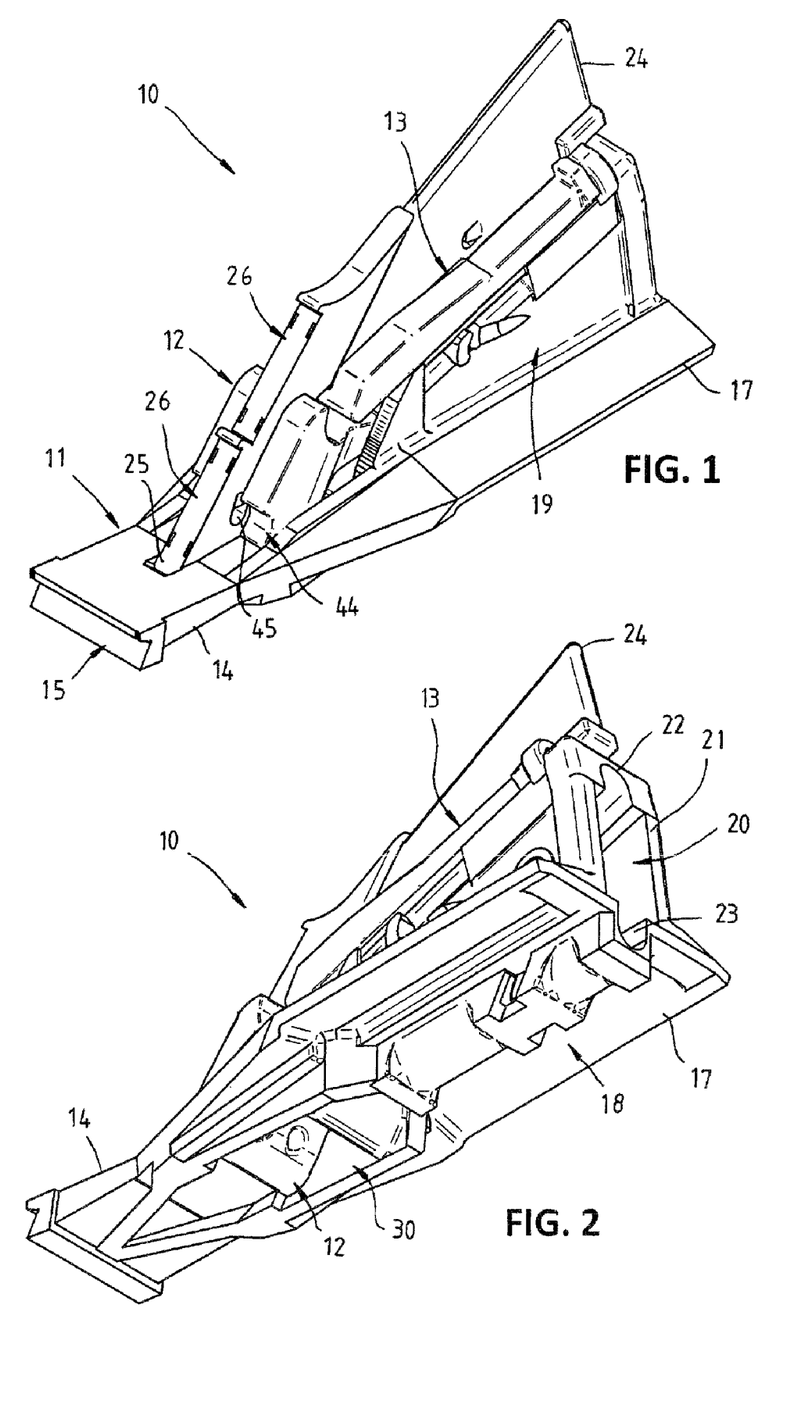
FIGS. 1 and 2 are views from above and below respectively of a digging point assembly according to a first embodiment of the invention.
Figure 3:
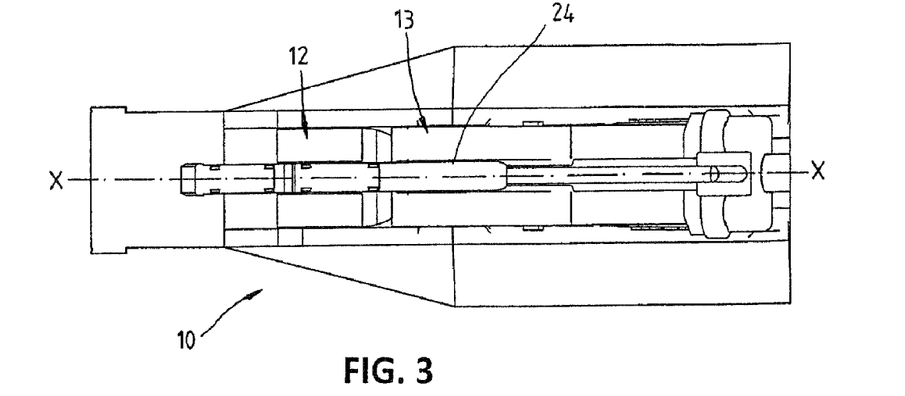
FIGS. 3, 4 and 5 are top, side and bottom views of the digging point assembly of FIGS. 1 and 2.
Figure 4:
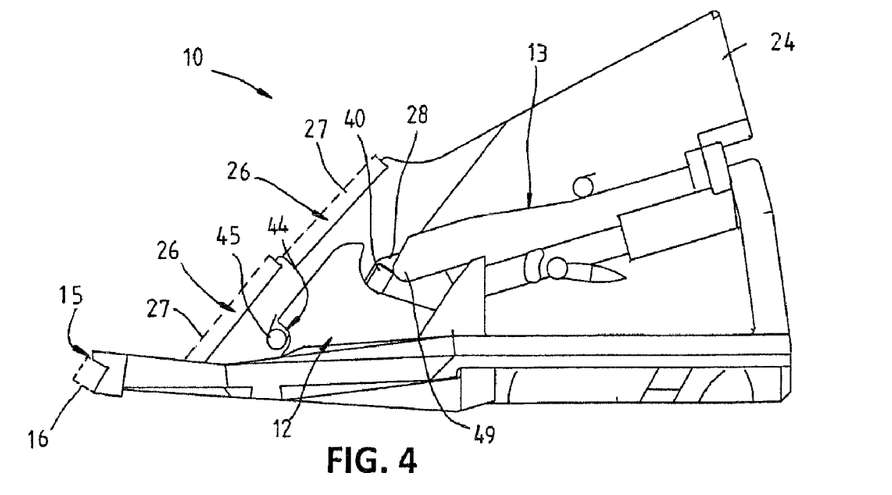
Figure 5:
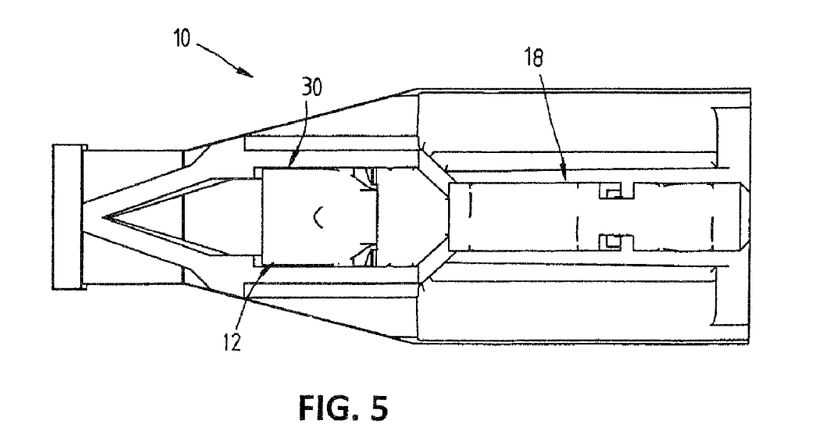
Figure 10:
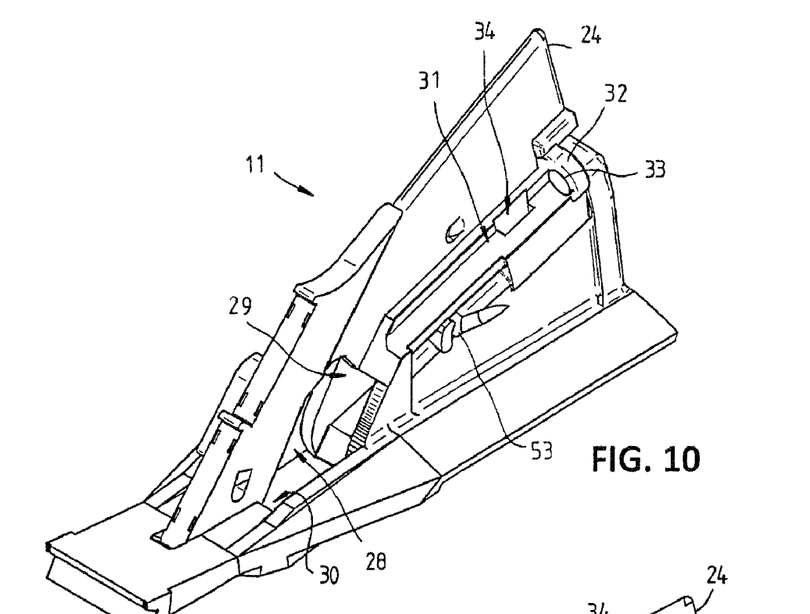
FIG. 10 illustrates the main body of the digging point assembly with the wear parts removed.

A transverse opening 28 is formed in the main body 11 at the leading end of the socket member 19 (see also FIG. 10) between the socket member 19 and fin 24 and the socket 20 opens at its leading end 29 to the opening 28. A further opening 30 is provided in the base of the main body 11 which communicates with the opening 28 as shown in FIGS. 2, 5 and 10 to allow for the insertion of the wear parts 12 and 13, the opening 30 being of slightly greater width than the width of the wear parts 12 and 13.

Downwardly inclined shoulders 31 (see FIG. 10) are formed at the top side of the socket member 19 on opposite sides of the central fin 24 and a locator 32 for the second wear part 13 is provided at the trailing end of each shoulder 31. The locators 32 define circular openings 33 into which ends of the second wear part 13 project in use as described further below. Slots 34 are also proved in the shoulders 27 forwardly of the locators 32.

Figure 6:
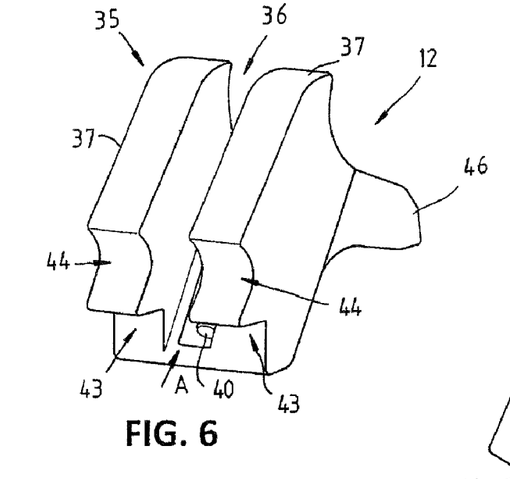
FIG. 6 illustrates a first replaceable wear part of the digging point assembly.
Figure 7:
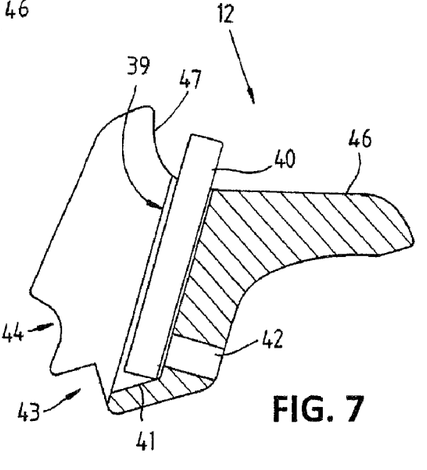
FIG. 7 is a longitudinal cross sectional view, the first replaceable wear part with associated retaining pin.
Figures 8, 9:
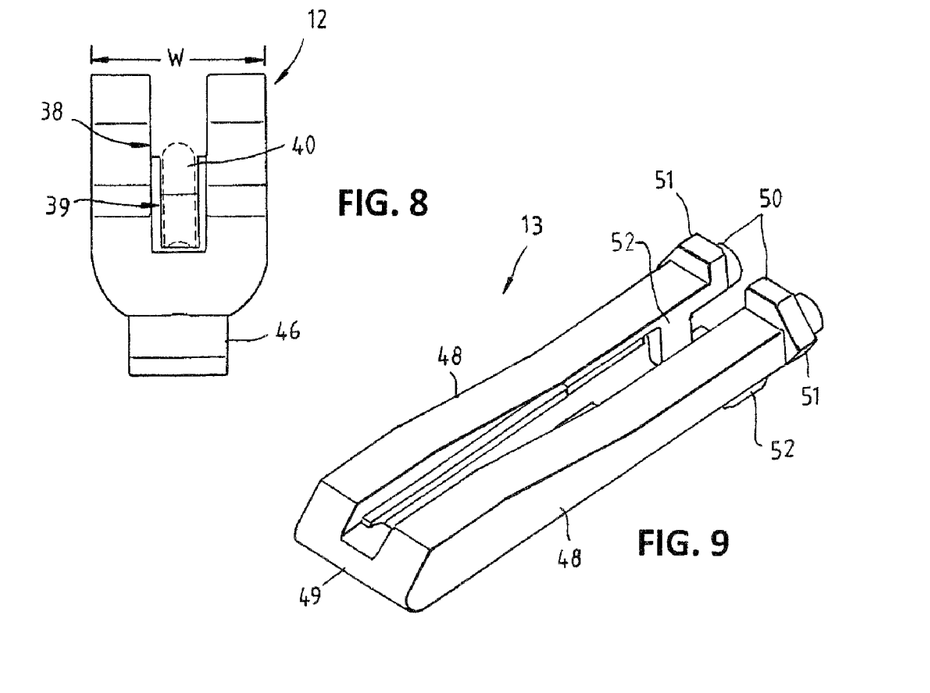
FIG. 8 is a front view of the first replaceable wear part in the direction A of FIG. 6.
FIG. 9 is an isometric view of a second replaceable wear part of the digging point assembly.

The first wear part 12 shown also in FIGS. 6 to 8 is designed to protect the leading end and sides of the socket member 19 against wear and for this purpose, the wear part 12 has a width W which is at least the width of the socket member 19. The wear part 12 includes a bifurcated leading end 35 which is defined by a central channel or recess 36 which splits the leading end 35 of the part 12 into two spaced flanges 37. The channel 36 is of a stepped configuration comprising an outermost part 38 which is of a width substantially the same as the width of the central fin 24 adjacent the opening 28 such that it is capable of receiving portion of the fin 24 as described below. The channel 36 also includes an innermost part 39 which is adapted to receive a retaining pin 40 (shown in FIGS. 6 and 7 and in dotted outline in FIG. 8), the retaining pin 40 having a diameter slightly less than the width of the channel part 39 but being of a greater length than the channel part 39. The channel part 39 is also closed by an end wall 41 which closes the normal lower end of the channel part 34 whilst the operative upper end of the channel part 39 remains open so that the pin 40 can project or extend above the channel part 39 as shown in FIG. 7 when the opposite end of the pin 40 abuts the wall 41. A releasing hole 42 extends transversely from the channel part 49 to the outer surface of the wear part 12 to facilitate removal of the pin 40 by insertion of an appropriate pin or tool therein.

The leading outer end of the wear part 12 includes at its lower end a stepped recessed portion 43 (provided in each flange 37) adapted to seat on the base 14 of the main body 11 on opposite sides of the central fin 24. Transversely aligned arcuate recesses 44 are provided in each flange 37 adjacent to and above the recessed portion 43, the recesses 44 in use being adapted to be aligned with a transverse aperture 45 in the fin 24 of the main body 11 (see FIG. 1). The first wear part 12 also includes on its rear side a rearwardly directed tongue 46 of a width slightly less than the width of the socket 20 and which is adapted to extend into the leading open end 29 of the socket 20. The flanges 37 are concavely curved in their top surfaces to join or merge into the tongue 46.

The second wear part 13 shown in FIG. 9 is of an elongated U-shaped configuration having a pair of opposite side arms 48 and a connecting transverse arm 49 at one end thereof adapted to be located in the opening 28 through the main body 11, the side arms 48 being spaced apart a distance slightly greater than the width of the central fin 24. The arms 48 are adapted to lie along the shoulders 31 on the top side of the socket member 19 on opposite sides of the central fin 24 and extend into the circular openings 33 in the end locators 32 to be captured therein. For this purposes, the arms 48 are provided with spigots 50 at their free ends which are complementary to the openings 33 and which extend beyond stops 51 adjacent the free ends. The arms 48 are additionally provided on their lower sides adjacent the stops 51 with respective rearwardly directed hooks 52 for receipt in and engagement with the slots 34.

The socket member 19 of the main body 11 is provided with a transverse opening 53 through which a retaining wire or pin may be passed and passed through a corresponding transverse opening in the tip of the tyne to positively retain the digging point 10 assembly to the tyne tip.

Figure 11:
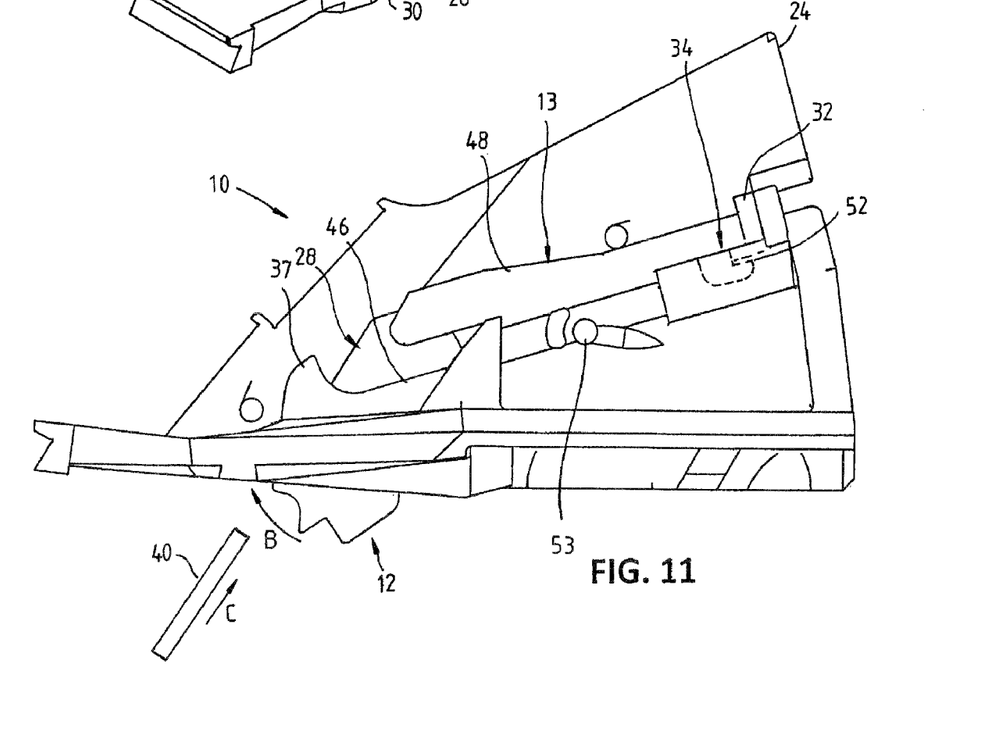
FIG. 11 illustrate the manner in which the parts of the digging point assembly are assembled.

For assembly purposes, the U-shaped wear part 13 is twisted and passed into the opening 30 from the underside of the main body 11 and then twisted back such that the respective arms 48 thereof can locate on opposite sides of the central fin 24. The respective arms 48 are then positioned to lie along the shoulders 31 on the top of the socket member 19 on opposite sides of the fin 24 with the spigots 50 extending into the openings 33 in the end locators 32 as illustrated in FIG. 11 with the hooks 52 being received and hooked into the slots 34 to hold the wear part 13 in position. In this position the transverse arm 49 extends transversely through the opening 28.

The other wear part 12 is then passed into the opening 30 again from the underside of the main body 11 so that the respective flanges 37 thereof locate on opposite sides of the central fin 24 adjacent the opening 28 and the tongue 46 extends into the leading open end 29 of the socket 20. For this purpose the tongue 46 is initially inserted into the end 29 of the socket 20 and the opposite end of the wear part 12 pivoted upwardly in the direction B of FIG. 11. Prior to pivoting the wear part 12 however, the retaining pin 40 is inserted from below in the direction C into the innermost part 39 of the channel 36 so that it projects beyond the channel 36 and abuts the end wall 41 as in FIG. 7. Subsequent pivoting of the wear part 12 upwardly in the direction B will move the wear part 12 towards the position of FIGS. 1, 2 and 4. The wear part 12 is positioned such that the stepped recessed portions 43 seat on the top surface of the base 14 and the wear part 12 it can then slide forwardly on the base 14 to the position of FIGS. 1, 2 and 4 in which the innermost part 39 of the recess 36 is closed by the fin 24 and the pin 40 is captured in the channel part 39. In this position, the upper end of the pin 40 is located forwardly of the connecting arm 49 of the second wear part 13 and acts as a stop against the arm 49 to prevent the wear part 13 moving forwardly and detaching from the locators 32 and unlatching of the hooks 52.

Figure 12:
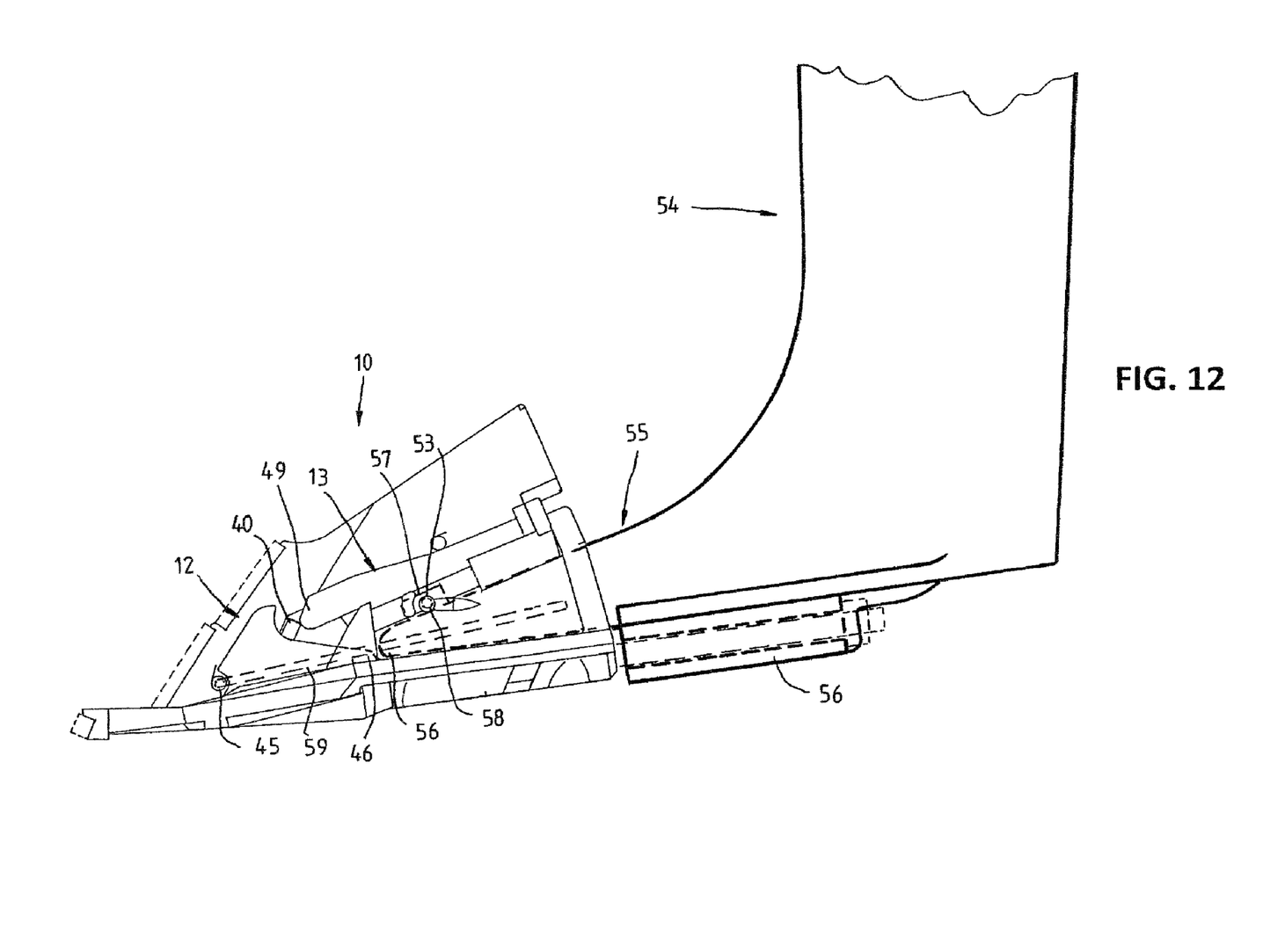
FIG. 12 illustrates the digging point assembly mounted to a tyne.
Figure 13:
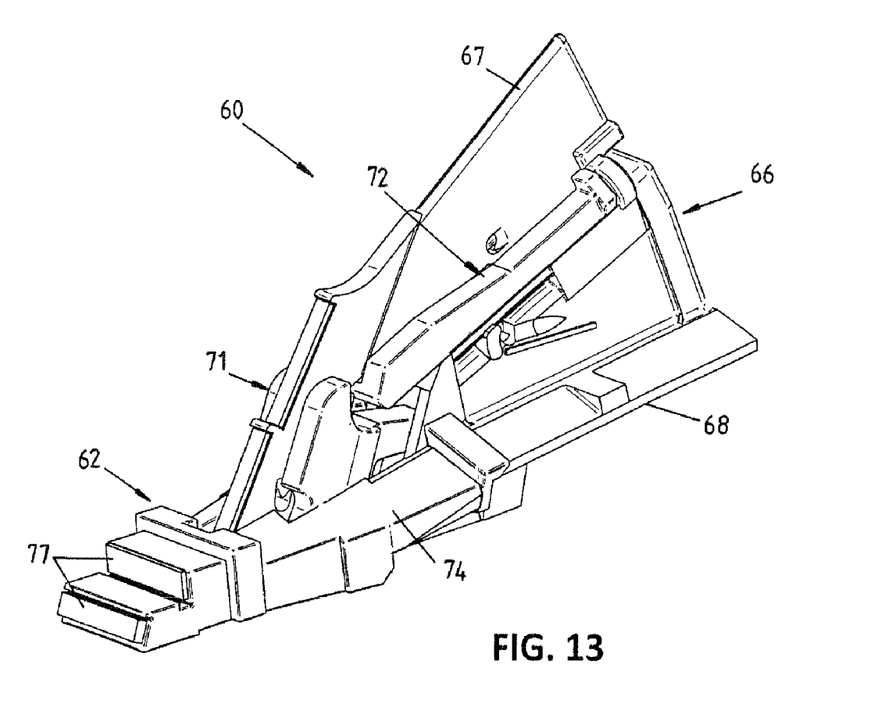
FIGS. 13 and 14 are views from above and below respectively of a digging point assembly according to a second embodiment of the invention.

As shown in FIG. 12, the point assembly 10 is used with a tyne 54 having a tapering tip 55 which is of a substantially complementary shape to the socket 20. The tip 55 as shown in dotted outline in FIG. 12 is inserted into the rear end 21 of the socket 20 and when the tip 55 is in its fully mated position in the socket 20, the leading end 56 thereof is located adjacent to or in abutment with the trailing end of the tongue 46 of the wear part 12 which extends into the end 29 of the socket 20. This prevents the wear part 12 being moved rearwardly from its position of FIGS. 1, 2 and 4 in which the pin 40 prevents detachment or movement of the second wear part 13. The tip 55 may be retained in position by a bolt or stud/nut connection as show in dotted outline between the aforementioned connector engagement means 18 on the underside of the point assembly 10 and a channel 56 on the underside of the tip 55. Tightening the bolt or nut will urge the point assembly 10 firmly into engagement with the tip 55 of the tyne 54. Alternatively the tip 55 which may have at least an apertured lug 57 may be secured relative to the point assembly 10 by means of a transverse wire 58 passed through the transverse opening 53 and lug 57 which is aligned with the opening 53.

The wear part 12 being of the same or greater width of the socket member 19 acts to protect the sides and leading end of the socket member 19 from wear when in use in soil by deflecting soil around and past the socket member 19 and the second wear part 13 protects the top shoulders 31 of the socket member 19 and also the sides of the socket member 19 by also deflecting soil away from the shoulders 31. The wear strips or members 16 and 27 applied to the tip 15 of the digging point assembly 10 and the recesses 26 also protect leading edges of the digging point assembly 10. Typically the wear resistant parts 12 and 13 are formed of tungsten carbide or other wear resistant materials and may be readily replaced when they have excessively worn however it is usually not necessary to replace the main body 11 as it has been protected. The wear strips or members 16 and 27 applied to the tip 15 or recesses 26 are usually attached by silver soldering and therefore can also be readily replaced.

For detachment of the two wear parts 12 and 13, the tip 55 of the tyne 54 is required to be at least partly retracted from the socket 20 by release of the pin or wire 58 or loosening of the bolting connection via the connector 18. This will permit rearward movement of the wear part 12 and detachment of the pin 50. The wear part 12 can then be withdrawn through the opening 30 and thereafter the wear part 13 can be moved forwardly and detached. These parts 12 and 13 may then be replaced with new parts.

Further protection for the sides of the socket member 19 can be provided by a wire or rod 59 passed through the openings 45 which also locates in the recesses 44 in the wear part 12 and which can be bent along the sides of the wear part 12 and socket member 19 as shown in dotted outline in FIG. 12. The retaining wire or rod 59 passed through opening 53 and lug 57 may also be bent back on either side to further protect the sides of the socket member 19.

The main body 11 of the digging point assembly 10 may be of various designs and configurations as may be the wear parts 12 and 13. The socket 20 defined by the socket member 19 is designed to mate with the tip 55 of the tyne 54 and therefore may be of various cross sectional forms to suit the tip 55. The main body 11 may be varied in design to omit the slots 34 in which case the wear part 13 will be held in position by engagement with the locators 32. Alternatively the arms 48 may include opposing lugs on their inner sides which may locate in corresponding recesses in opposite side of the fin 24 or in an opening in the fin 24.

Referring now to FIGS. 13 to 17, there is illustrated a digging point assembly 60 according to a further embodiment of the invention which is similar to the embodiment of FIGS. 1 to 5 however in this case the main point body 61 is truncated at its leading end and is adapted to cooperate with a leading shroud-like wear part 62 which envelopes the leading end of the body 61. The wear part 62 includes a leading socket member 63 which is provided with a rearwardly open socket 64 and the body 61 includes a forwardly extending stepped tongue 65 which is complementary to and adapted to be received in the socket 64. The main point body 61 is otherwise similar to the main point body 11 of the assembly 10 including a socket 66 for engagement by the tip of a tyne or the like, a central upstanding fin 67, opposite side fins 68 (which in this case are also truncated), a transverse opening 69 at the forward end of the socket 66 which opens through further opening 70 to the underside of the body 61. The main point body 61 is also adapted to carry a pair of replaceable wear parts 71 and 73 similar to the wear parts 12 and 13. The body 61 additionally includes a pair of side rails 73 between the leading ends of the fins 68 and tongue 65.

The leading wear part 62 additionally includes a pair of side fins or arms 74 which extend rearwardly from the socket member 63 and which in the assembled position of the digging point assembly 60 serve as extensions to the side fins 68. The fins 74 are shaped on their underside to mate with and slide along the rails 73. The leading end of the wear part 62 further includes upper and lower transversely extending recesses 75 and 76 adapted to receive hardened tips or strips 77 (see FIGS. 13 and 14) of complementary shape to the recesses 75 and 76. As is apparent, the recess 76 leads the recess 75 and is stepped downwardly therefrom. The tips or strips 77 are typically formed of tungsten carbide and are secured in position by soldering.

The wear part 62 additionally includes on its underside and centrally relative to the fins 74 a rearwardly extending tongue 78 which extends rearwardly from the socket member 63 and terminates in an enlarged head 79.

Figure 17:
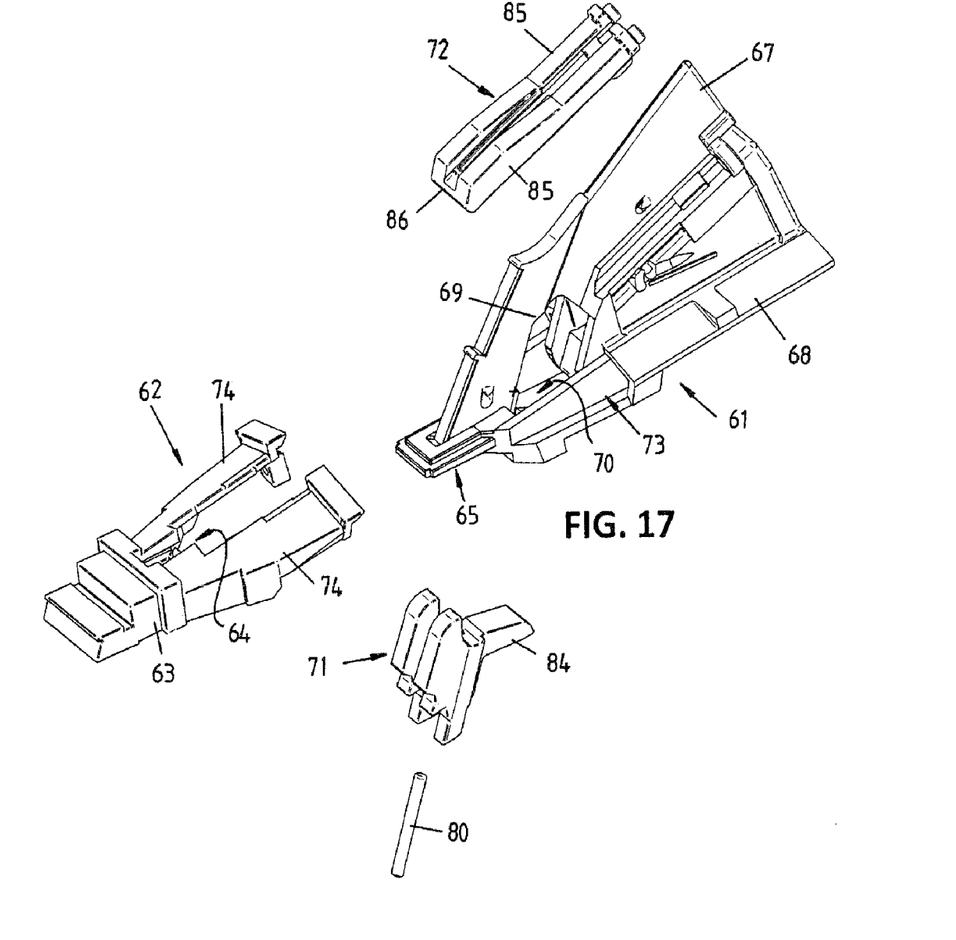
FIG. 17 is an exploded view of the digging point assembly of FIGS. 13 and 14.

As shown in the exploded view of FIG. 17, the digging point assembly 60 also includes a retaining pin 80 similar to but longer than the pin 40 shown in FIG. 7.

Figure 18:
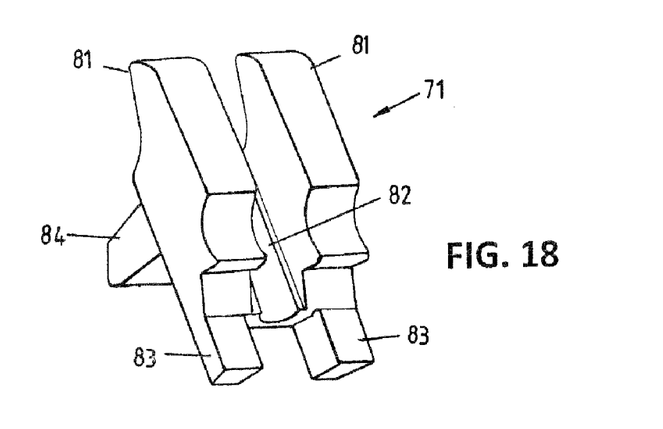
FIG. 18 is an enlarged view of a wear part similar to that of FIG. 6 modified for use in the embodiment of FIGS. 13 and 14.

The wear part 71 as shown in FIG. 18 is as stated above similar to the wear part 12 and is designed to protect the leading end and sides of the socket 66 of the body 61 and is bifurcated at its leading end to form two flanges 81 which are adapted to be located on either side of the central fin 67 and which further form therebetween a central channel or recess 82 which is complementary in cross section to the retaining pin 80. In this case the channel or recess 82 is open at each end. Further the flanges 81 differ from the flanges 35 of the wear part 12 in that they are extended on their operative lower side beyond the channel or recess 82 to form two transversely spaced fingers or stops 83 which can extend into the opening 70 as described further below.

As with the wear part 12, the wear part 75 includes on its rear side a rearwardly directed tongue 84 of a width slightly less than the width of the socket 66 such that it can extend into the leading end thereof.

The wear part 72 is of substantially the same construction as the wear part 13 of the digging point assembly 10 being of a generally elongated U-shaped configuration defined by a pair of spaced side arms 85 joined at one end by a transverse cross arm 86.

For assembly purposes, the U-shaped wear part 72 is initially located in position on the upper side of the socket 66 in the same manner as described with the wear part 13 such that the transverse arm 85 extends through the transverse opening 69.

Figure 19:
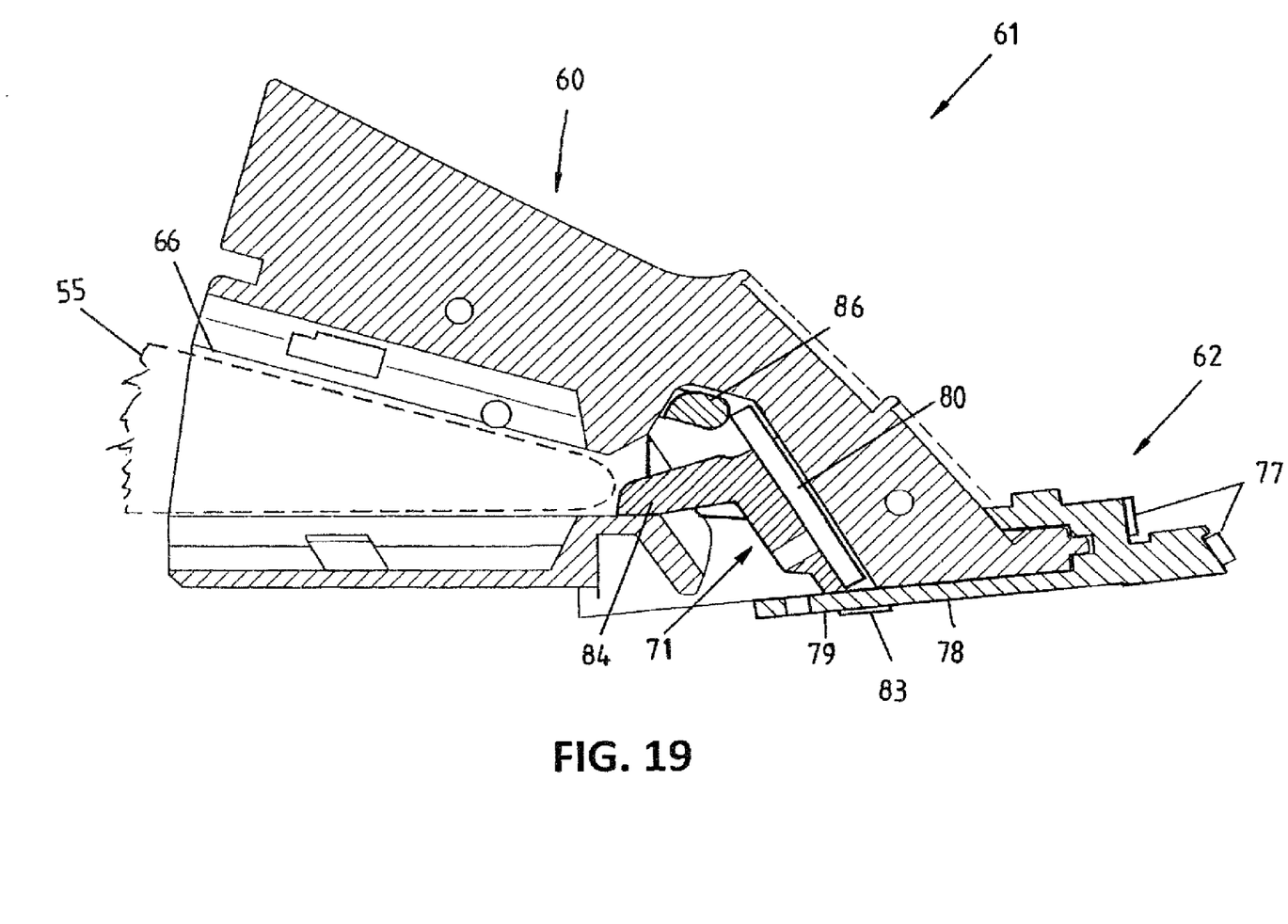
FIG. 19 is a longitudinal sectional view of the digging point assembly of FIGS. 13 and 14 and showing its association with the tip of a tyne (shown in dotted outline).

The wear part 71 is also assembled with the body 61 in the same manner as described with the wear part 12 of the digging point assembly 10 and so that the tongue 84 extends into the leading end of socket 66 as indicated in FIG. 19. The retaining pin 80 is then inserted through the opening 70 on the underside of the body 61 into the channel 82 to extend above the wear part 71 as shown in FIG. 19 it which position the upper end of the pin 80 is located forwardly of the transverse arm 86 of the wear part 72. Further in this position the two fingers 83 are located above the lower side of the main body 61.

Figure 14:
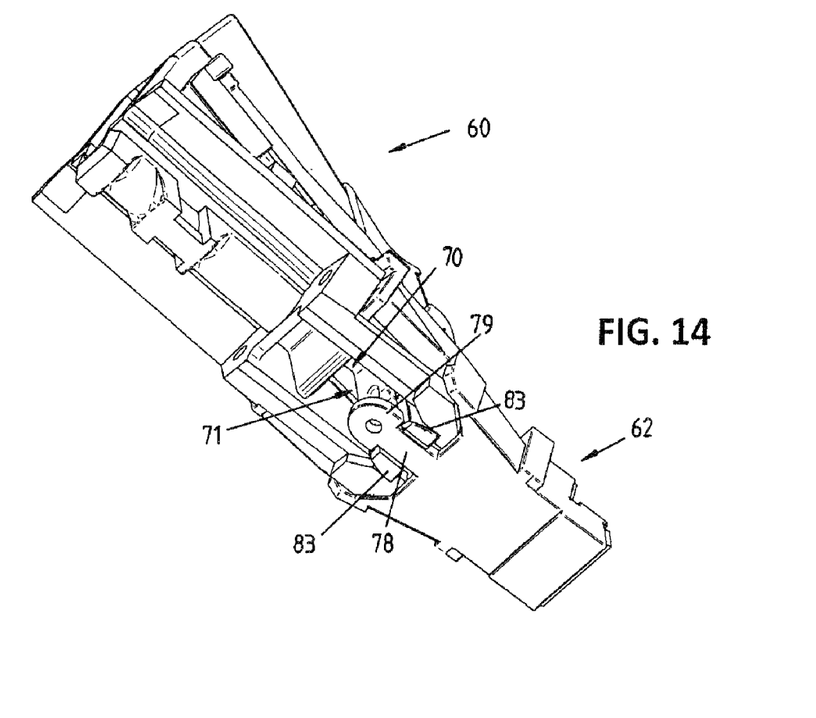

The leading wear part 62 is then slid longitudinally onto the leading end of the body 61. In this position, the tongue 78 is located centrally relative to the opening 70 such that when the wear part 71 is lowered, the fingers 83 are located on opposite sides of the tongue 78 and defined stops to the enlarged head 79 of the tongue 78 as best seen in FIG. 14. In this position, the wear part 71 prevents detachment of the leading wear part 62 from the body 61. Further in this position, the lower end of the retaining pin 80 abuts the top surface of the tongue 78 and therefore is retained in the position of FIG. 19.

When the tapering tip 55 of a tyne is inserted into the socket 66 as shown in dotted outline in FIG. 19, the leading end thereof is located adjacent to or in abutment with the trailing end of the tongue 84 of the wear part 71. This prevents the wear part 71 being moved rearwardly and upwardly from its position of FIG. 19. In this position, the pin 80 prevents forward movement of the second wear part 72 and it detachment from the body 61 and further the fingers 83 of the wear part 71 prevent detachment of the leading wear part 62.

As above the tip 55 may be retained in position by a bolt or stud/nut connection or by connector engagement means on the underside of the point assembly 60. Alternatively the tip 55 which may have at least an apertured lug may be secured relative to the point assembly by means of a transverse wire passed through the transverse opening in the body 61 and lug.

For disassembly purposes, the tyne tip 55 is withdrawn from the socket 66 which allows the wear part 71 to be raised to retract the stop fingers 83 from opposite sides of the tongue 78 which enables the leading wear part 62 to be detached and thereafter the wear parts 71 and 72 can be removed through the opening 70.

Figure 15:
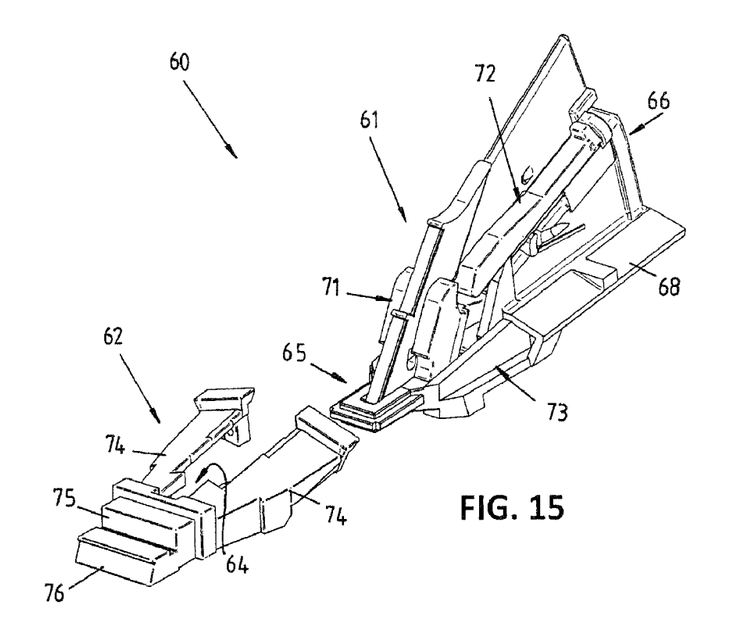
FIGS. 15 and 16 are views from above and below respectively of the digging point assembly of FIGS. 13 and 14 with the leading replaceable end portion detached.
Figure 16:
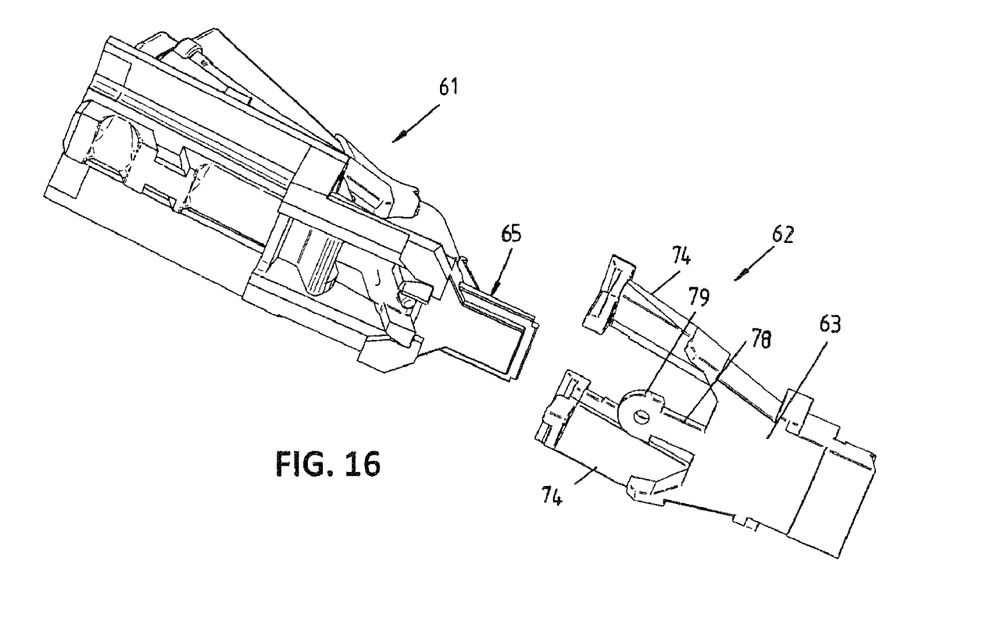

The leading end of the fin 67 may be provided with wear strips (as shown in FIGS. 15 and 17 and in dotted outline in FIGS. 15) similar to the wear strips 26. It will also be appreciated that the shape of the various parts of the assembly 60 may be varied from that illustrated and described.

It should be noted that reference to the prior art herein is not to be taken as an acknowledgement that such prior art constitutes common general knowledge in the art.

The terms "comprising" or "comprises" as used throughout the specification and claims are taken to specify the presence of the stated features, integers and components referred to but not preclude the presence or addition of one or more other feature/s, integer/s, component/s or group thereof.

Whilst the above has been given by way of illustrative embodiment of the invention, all such variations and modifications thereto as would be apparent to persons skilled in the art are deemed to fall within the broad scope and ambit of the invention as herein defined in the appended claims.

The invention claimed is:

1. A digging point assembly comprising:
    a main point body, said body having a longitudinal axis, and a longitudinally extending socket member having a leading end and a trailing end, a socket extending longitudinally of said socket member, said socket opening to said trailing end of said socket member and being adapted to receive a tip or foot of a tyne of an earth working implement for mounting of said main point body to said tyne, said socket further opening at said leading end of said socket member, and
    at least two sub-parts carried by said main point body, each said sub-part comprising a replaceable wear part adapted to protect different parts of said main point body exposed in use to wear in movement of said digging point assembly through soil, said sub-parts comprising:
    a first sub-part located in an operative position forwardly of said leading end of said socket member for protecting said leading end of said socket member from wear, said tip or foot of said tyne cooperating with said first sub-part to prevent said first sub-part from moving away from said operative position when said main point body is mounted to said tyne, and
    a second sub-part, said first sub-part when in said operative position cooperating directly or indirectly with said second said sub-part to prevent the second sub-part from being detached from a position in which it protects a further part of said main body from wear.

2. A digging point assembly as claimed in claim 1 wherein said first sub-part includes a channel or recess, a retaining pin accommodated in the channel or recess of the first sub-part, said retaining pin cooperating with the second sub-part to prevent detachment detachment thereof.

3. A digging point assembly as claimed in claim 2 wherein the first sub-part includes a tongue which extends into the opening in the socket at the leading end of the socket member, and wherein a leading end of the tip or foot of said tyne is located adjacent to or abuts the tongue to prevent substantial movement of the first sub-part when said main point body is mounted to said tyne.

4. A digging point assembly as claimed in claim 3 wherein said main body includes a central fin extending forwardly of the socket member and wherein a transverse opening is provided in the main body between the fin and said leading end of said socket member, said first sub-part being located in the opening and extending to opposite sides of said fin.

5. A digging point assembly as claimed in claim 4 wherein said first sub-part includes spaced flanges located on opposite sides of the fin.

6. A digging point assembly as claimed in claim 5 wherein said channel or recess in said first sub-part is located between the flanges, the recess or channel having an open side which is closed by said fin when the first sub-part part is in said operative position.

7. A digging point assembly as claimed in claim 6 wherein said retaining pin in the operative position of the first sub-part has a portion extending above the first sub-part for cooperation with, to act as a stop to, the second sub-part.

8. A digging point assembly as claimed in claim 7 wherein said socket member includes a pair of shoulders on its upper side on opposite sides of said central fin and wherein the second sub-part includes a pair of side arms adapted to be located or seat on said shoulders.

9. A digging point assembly as claimed in claim 8 wherein the second sub-part includes a cross arm joining said side arms, said cross arm being adapted to extend through the opening in the main body and be located adjacent the extending portion of the retaining pin.

10. A digging point assembly as claimed in claim 9 wherein the second sub-part is of an elongated U-shaped configuration.

11. A digging point assembly as claimed in claim 1 and including a third sub-part, said third sub-part being located at a leading end of said main point body and comprising a replaceable wear part for protecting the leading end of said main point body and wherein said first sub-part is adapted in said operative position to cooperate with said third sub-part to maintain the third sub-part in position at the leading end of said main point body.

12. A digging point assembly as claimed in claim 11 wherein said third sub-part includes a socket and wherein said leading end of said main body includes engagement means complementary to said socket for receipt therein.

13. A digging point assembly as claimed in claim 12 wherein said main point body includes opposite side fins and wherein said third sub-part includes opposite side arms or fins which comprise extensions of the fins of said main point body when said third sub-part engaged with the leading end of said main point body.

14. A digging point assembly as claimed in claim 11 wherein said first sub-part includes a stop member adapted to act as a stop to prevent detachment of said third sub-part from said main point body.

15. A digging point assembly as claimed in claim 14 wherein said third sub-part includes a headed member and wherein said stop member is adapted to cooperate with said headed member.

16. A digging point assembly as claimed in claim 15 wherein said headed member comprise a tongue terminating in an enlarged head and wherein said first sub-part includes a pair of spaced stop members adapted to be located on opposite sides of said tongue for cooperation with said head.

17. A digging point assembly comprising:
a main point body adapted to be mounted to a tyne of an earth working implement, said main point body having a longitudinal axis and a leading end and a trailing end, said main point body including a socket member extending along said longitudinal axis, said socket member defining a hollow socket open at the trailing end of said main body for receiving a tip of said tyne, said socket opening at the leading end of said socket member,
at least two replaceable wear parts carried by said main point body for protecting different parts of said main body normally exposed to wear in movement of said main point body through earth or soil, said replaceable wear parts comprising:
a first wear part located in an operative position forwardly of the leading end of said socket member and extending transversely of said main body for protecting the leading end of said socket member, said first wear part having a tongue extending into the socket through the opening therein at the leading end of said socket member, and
a further wear part protecting a further part of said main point body,
the leading end of said tip being in abutment with or being located adjacent to said tongue of said first wear part when said main point body is mounted to said tyne, said first wear part being maintained in said operative position by the leading end of said tip of said tyne and cooperating directly or indirectly with said further wear part to maintain said further wear part in position on said main point body and prevent its detachment from said main point body.

18. A digging point assembly as claimed in claim 17 wherein said main point body includes a transverse opening at the leading end of said socket member and a longitudinally extending fin, said first wear part including spaced flanges and being received in said opening such that said spaced flanges are arranged respectively on opposite sides of said fin.

19. A digging point assembly as claimed in claim 18 wherein said socket member includes a pair of shoulders on its top side on opposite sides of said fin which extend rearwardly from said transverse opening and wherein the further wear part comprises a second wear part having a pair of side arms located and seating on said shoulders.

20. A digging point assembly as claimed in claim 18 wherein said first wear part includes a recess or channel between said flanges which accommodates a retaining pin, said recess or channel being closed on one side by said fin to capture said retaining pin in said recess or channel and wherein said retaining pin cooperates with a leading end of the second wear part to prevent detachment thereof.

21. A digging point assembly as claimed in claim 20 wherein said retaining pin has a portion extending above the first wear part to act as a stop to the further wear part.

22. A digging point assembly as claimed in claim 21 wherein the second wear part is of a U-shaped configuration and includes a cross arm joining said side arms, said cross arm extending through the transverse opening in the main point body and being located adjacent the extending portion of the retaining pin, said extending portion of said pin acting as a stop to said cross arm.

23. A digging point assembly as claimed in claim 22 and including means for capturing trailing ends of said arms and wherein said retaining pin prevents disengagement of the ends of the arms from said capturing means.

24. A digging point assembly as claimed in claim 17 wherein said further wear part is located at a leading end of said main point body and comprising a replaceable wear part for protecting the leading end of said main point body and wherein said first wear part cooperates with said further wear part to maintain the further wear part in position protecting the leading end of said main point body.

25. A digging point assembly as claimed in claim 24 wherein said further wear part includes a socket and wherein said leading end of said main body includes engagement means complementary to said socket for receipt therein.

26. A digging point assembly as claimed in claim 25 wherein said body includes opposite side fins and wherein said further wear part includes opposite side arms or fins which comprise extensions of the fins of said body.

27. A digging point assembly as claimed in claim 24 wherein said first wear part includes a stop member and wherein said further wear part includes a headed member on its lower side, said stop member cooperating with said headed member to prevent detachment of said further wear part from said main point body.

28. A digging point assembly comprising:
a main body adapted to be mounted to a tyne of an earth working implement, said main body including a central longitudinally extending socket member defining a socket adapted for engagement by a tip or foot of the tyne, said socket being open at its leading end, said main body further includes a central fin extending forwardly of the socket member and a transverse opening in the main body between the fin and socket member, and
at least two sub-parts, each said sub-part comprising a replaceable wear part adapted to protect different parts of said main body exposed in use to wear in movement of said digging point assembly through soil, said sub-parts comprising a first sub-part and a second sub-part,
said first sub-part in its operative position being adapted to be located in the transverse opening and extend to opposite sides of said fin, said first sub-part including a tongue adapted to extend into the open leading end of the socket and wherein a leading end of the tip of the tune is adapted to be located adjacent to or abut the tongue to prevent substantial movement of the first sub-part away from said operative position when said main body is mounted to said tyne, and
a retaining pin associated with the first sub-part, said retaining pin in said operative position of said first sub-part being adapted to cooperate with the second sub-part to prevent substantial movement thereof and detachment of said second sub-part from said main body thereby to maintain the second sub-part in position protecting a part of said main body.

29. A digging point assembly as claimed in claim 28 wherein said first sub-part includes spaced flanges adapted to be located on opposite sides of the fin and wherein said first sub-part includes a channel or recess between the flanges adapted to accommodate the retaining pin, the recess or channel having an open side which is closed by said fin when the first sub-part is in its operative position and wherein said retaining pin has a portion extending above the first sub-part for cooperation with, to act as a stop to, the second sub-part.

30. A digging point assembly as claimed in claim 29 wherein said socket member includes a pair of shoulders on its upper side on opposite sides of said central fin and wherein the second sub-part includes a pair of side arms adapted to be located or seat on said shoulders and a cross arm joining said side arms, said cross arm being adapted to extend through the transverse opening in the main body and be located adjacent the extending portion of the retaining pin.

31. A digging point assembly as claimed in claim 30 and including a third sub-part, said third sub-part being located at a leading end of said main body and comprising a replaceable wear part for protecting the leading end of said body and wherein said first sub-part is adapted in its operative position to cooperate with said third sub-part to maintain the third sub-part in position.

32. A digging point assembly as claimed in claim 31 wherein said third sub-part includes a socket, said leading end of said main body including engagement means complementary to said socket for receipt therein and wherein said first sub-part includes a stop member adapted in said operative position to act as a stop to prevent detachment of said third sub-part from said body.

33. A digging point assembly comprising a main body adapted to be mounted to a tyne of an earth working implement,
said main body having a longitudinal axis, said main body including a socket member extending along said longitudinal axis and having a leading and trailing end, said socket member defining a hollow socket which has an opening at the trailing end of said socket member for receiving a leading tip of said tyne for mounting said main body to said tyne, said socket further having an opening at the leading end of said socket member,
first and second replaceable wear parts mounted to said main body to protect different parts of said main body normally exposed to wear in movement of said main body through earth or soil,
said first wear part being mounted to said main body to extend transversely thereof to protect the leading end of said socket member, and wherein when said main body is mounted to a said tyne, said first wear part is maintained in an operative position by said tyne and cooperates directly or indirectly with said second wear part to maintain said second wear part in position and prevent its detachment from said main body.

34. A digging point assembly as claimed in claim 33 wherein first wear part includes a rearwardly extending tongue, said tongue extending into the opening of the socket at the leading end of said socket member and wherein said tip of said tyne cooperates with said tongue to prevent detachment of said first wear part from said main body.

35. A digging point assembly as claimed in claim 34 wherein said socket member includes a pair of shoulders on its top side, said second wear part including a pair of side arms located and seating on said shoulders.

36. A digging point assembly as claimed in claim 35 and including a third sub-part, said third sub-part being located at a leading end of said main body and comprising a replaceable wear part for protecting the leading end of said body and wherein said first wear part cooperates with said third wear part to maintain the third part in its position at the leading end of said main body.

37. A digging point assembly as claimed in claim 36 wherein said third part includes a socket and wherein said leading end of said main body includes engagement means complementary to said socket for receipt therein, said first wear part including a stop member and said third part includes a headed member on its lower side, said stop member cooperating with said headed member to prevent detachment of said third wear part from said main body.

38. A digging point assembly as claimed in claim 33 and including means for connecting said digging point assembly to said tyne, said connecting means comprising one of a retaining pin or wire receivable in aligned openings in said main body and said tyne, or adjustable connecting means for interconnecting said main body and said tyne on the underside thereof.

* * * * *